UNITED STATES PATENT OFFICE.

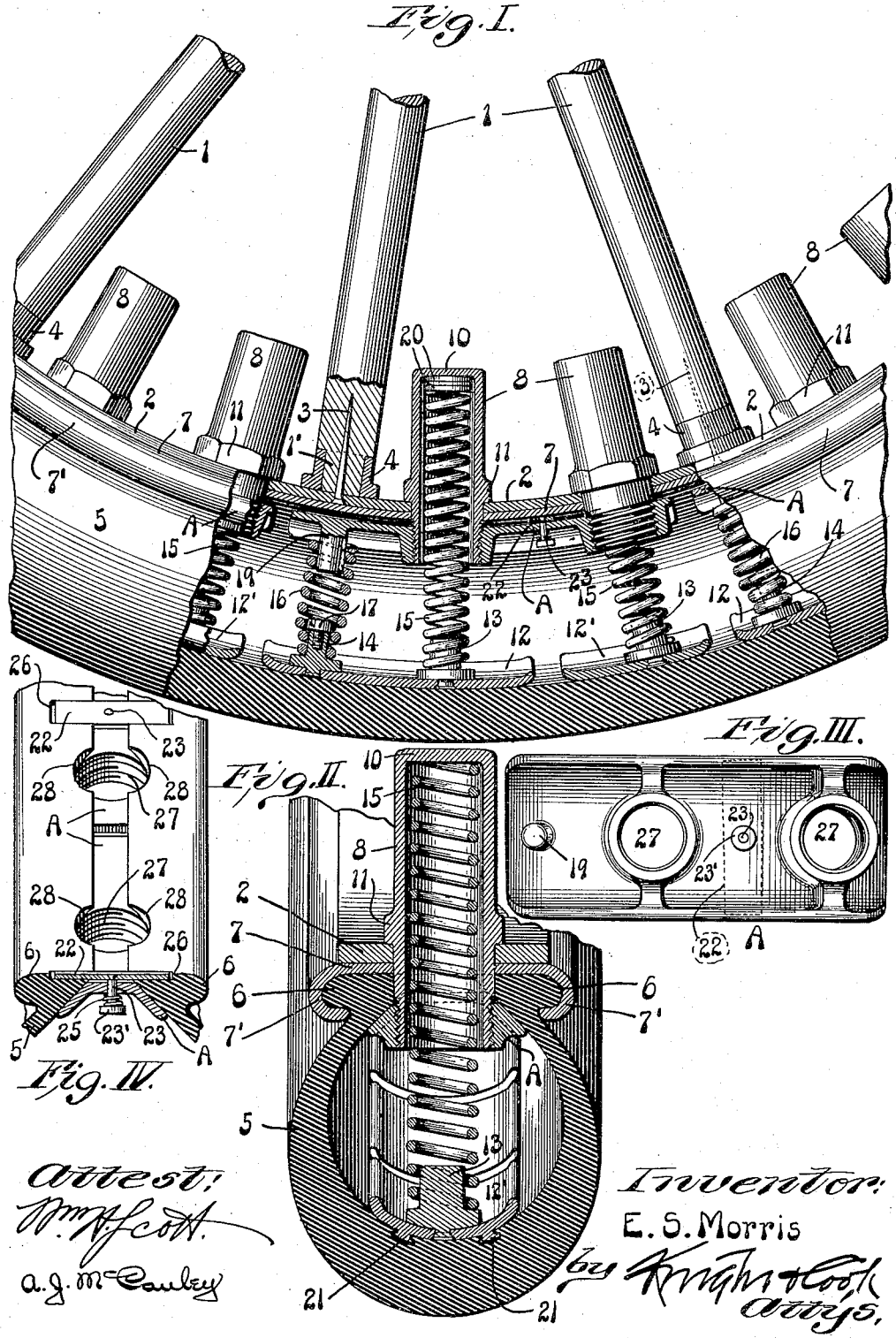

EMANUEL S. MORRIS, OF ST. LOUIS, MISSOURI.

SPRING-TIRE.

1,152,037. Specification of Letters Patent. Patented Aug. 31, 1915.

Application filed January 28, 1915. Serial No. 4,833.

*To all whom it may concern:*

Be it known that I, EMANUEL S. MORRIS, a citizen of the United States of America, and a resident of the city of St. Louis, in the State of Missouri, have invented certain new and useful Improvements in Spring-Tires, of which the following is a full, clear, and exact description, reference being had to the accompanying drawings, forming a part of this specification.

My invention relates to a spring tire, one of the objects being to produce a resilient tire, having spring holding devices that may be readily removed from the wheel structure.

Another object is to provide spring holding devices adapted to firmly secure a tire casing to a wheel rim.

A further object is to produce a tire having main springs which serve as cushions for the tire casing, in combination with auxiliary springs adapted to serve as cushions when the main springs are subjected to an abnormal load.

The invention also includes certain specific details of construction which will be hereinafter described and claimed.

Figure I is a fragmentary side elevation, partly in section, illustrating the yieldable elements of my spring tire. Fig. II is an enlarged transverse section of the tire. Fig. III is an enlarged detail view of one of the tire casing spreaders looking at the outer face thereof. Fig. IV is a fragmentary section showing the separable edges of the tire casing and the spreader members as they appear before the tire casing is placed on the rim looking at the inner face thereof.

1 designates wheel spokes, 2 is a metal felly ring fitted to the outer ends of the spokes and secured thereto by means of nails 3 passing through the felly ring and driven into the ends of the spokes. The outer end of each spoke is preferably provided with a tenon 1', which is surrounded by a metallic flanged abutment ferrule 4, the latter being fitted to the felly 2.

5 designates a rubber tire casing of the clencher type having the usual beads 6, and 7 designates a clencher rim adapted to receive the beads 6. The tire casing is fitted to the rim in the usual manner, with its beads 6 arranged in the channels 7' at the margins of the rim.

Tire casing spreaders A of peculiar construction art arranged within the tire casing and secured to radial spring pockets 8 which pass through the rim and felly. The spreaders A are located between and fitted to the separable edges of the tire casing, and the spring pockets 8 are screwed into said spreaders so that the spring pockets may be operated to force the tire beads 6 into the channels 7'. The spring pockets also serve as means for connecting the metal rim 7 to the metal felly 2. Each spring pocket is closed at one end to form a spring seat 10, and enlarged between its end to form an abutment member 11 which engages the inner face of the felly 2. The abutment 11 is preferably provided with a non-circular outer face adapted to receive a wrench.

12 and 12' designate spring seat members fitted to the inner face of the tire casing tread and provided with spring holding pins 13 and 14.

Main springs 15, arranged partly within the spring pockets 8 and partly within the tire casing, extend from the spring seats 10 to the spring holding pins 13. Auxiliary springs 16, are arranged between the spring seat members 12 and the tire casing spreaders A. The outer ends of the auxiliary springs are contracted, and these ends are secured to the spring holding pins 14 by screws 17 having heads which are larger than the inside diameters of the contracted ends of the springs 16. The main springs 15 normally serve as cushions for the tire, but the auxiliary springs 16 are normally ineffective, the inner ends of said auxiliary springs being free to move toward and away from the tire casing spreaders A. The auxiliary springs are preferably made of heavier, or more rigid, material than the main springs and they are arranged to coöperate with the main springs when the wheel is subjected to an abnormal or excessive load. Each tire casing spreader A is provided with a pin 19 alined with a spoke 1 and serving as a guide for an auxiliary spring 16. Each tire casing spreader A is also formed with two inwardly projecting collars 27 which are internally screw threaded to receive two of the spring pockets 8 which lie between the spokes 1.

Owing to the difficulty of tempering spiral springs, the main springs 15 are not of uniform strength, some of the springs being quite rigid while the others are comparatively free to yield under pressure. I preferably compensate for this lack of uniformity by placing washers 20, or other suitable fillers, between the inner ends of springs 15 and the seats 10, as shown in Fig. I. The pressure of the main springs may be reduced by removing one or more of the washers 20, and it may be increased by placing additional washers between the springs and the seats 10. It will be noted that the spring pockets 8 may be readily unscrewed from the spreaders A and removed from the wheel to permit the removal of the main springs, and also to permit the desired regulation by removing washers 20, or by placing additional washers in said spring pockets.

In assembling the different elements of my wheel, the spreaders A are preferably secured to the tire casing, as shown in Fig. IV, before the tire casing is placed on the rim. The spring seat members 12 and 12' are preferably permanently secured to the tire casing in any suitable manner, for example, by lugs 21 embedded in the tire casing as seen in Fig. II. The means for securing the spreaders to the tire casing comprises transverse bars 22 each of which is secured to a spreader A by means of a pin 23. Each pin 23 is provided with a head 23', and a spring 25 (Fig. IV) is preferably arranged between said head and the spreader. To secure the spreaders at predetermined points in the tire casing, the inner face of the latter is provided with recesses 26 (Fig. IV) and the transverse bars 22 are arranged in said recesses. The spreaders are thus securely held at points where their screw threaded openings 27 will register with notches 28, the latter being formed in the separable edges of the tire casing to receive the spring pockets 8. The spreaders may be secured to the tire casing as shown in Fig. IV, before the tire casing is placed on the rim, or if desired, the parts may be assembled by placing one of the separable edges of the tire casing onto the rim, then applying the spreaders and their transverse bars 26 to said edge, and thereafter placing the other edge of the tire casing between the spreaders and the bars 22. After the tire casing has been fitted to the rim, the springs are placed in the spring pockets and said pockets are inserted through the felly and rim and screwed into the collars 27 of the spreaders and the springs seated on the spring seat members.

I claim:—

1. The combination with a wheel rim of the clencher type, of a clencher tire casing fitted to said rim, spreaders within said casing at points adjacent to its separable edges, spring pockets passing through said rim and screwed into said spreaders, springs extending from said spring pockets, and means, independent of said spring pockets, for securing said spreaders to the casing; said means including transverse members secured to said spreaders and interlocked with one of the separable edges of the casing.

2. The combination with a wheel rim of the clencher type, of a clencher tire casing fitted to said rim, spreaders within said casing at points adjacent to its separable edges, spring pockets passing through said rim and screwed into said spreaders, springs extending from said spring pockets, and means, independent of said spring pockets, for securing said spreaders to the casing, said means including transverse bars yieldingly secured to said spreaders, the separable edges of the casing being arranged between said bars and spreaders.

E. S. MORRIS.

In presence of—
  E. K. CLARK,
  A. J. McCAULEY.

Copies of this patent may be obtained for five cents each, by addressing the "Commissioner of Patents, Washington, D. C."